United States Patent [19]

Varga

[11] 4,324,593

[45] Apr. 13, 1982

[54] SHAPEABLE TERTIARY AMINE N-OXIDE SOLUTION OF CELLULOSE, SHAPED CELLULOSE PRODUCT MADE THEREFROM AND PROCESS FOR PREPARING THE SHAPEABLE SOLUTION AND CELLULOSE PRODUCTS

[75] Inventor: Julianna K. Varga, Asheville, N.C.

[73] Assignee: Akzona Incorporated, Asheville, N.C.

[21] Appl. No.: 938,906

[22] Filed: Sep. 1, 1978

[51] Int. Cl.[3] .................... C08J 3/06; C08J 3/08; C08L 1/02

[52] U.S. Cl. .................... 106/203; 106/186; 162/71; 162/72

[58] Field of Search .................... 106/163, 186, 203; 162/72, 71; 8/196

[56] References Cited

U.S. PATENT DOCUMENTS

| | | | |
|---|---|---|---|
| 2,322,427 | 6/1943 | Edelstein | 536/56 |
| 2,574,210 | 11/1951 | Guardiola-Aragonese | 106/203 |
| 2,744,024 | 3/1956 | Farber | 106/203 |
| 3,447,939 | 6/1969 | Johnson | 106/203 |
| 4,028,132 | 6/1977 | Litt | 106/163 R |
| 4,142,913 | 3/1979 | McCorsley et al. | 106/186 |
| 4,144,080 | 3/1979 | McCorsley | 106/186 |
| 4,145,532 | 3/1979 | Franks et al. | 536/56 |

FOREIGN PATENT DOCUMENTS

| | | | |
|---|---|---|---|
| 472574 | 4/1951 | Canada | 106/203 |
| 217166 | 9/1924 | United Kingdom | 106/203 |

*Primary Examiner*—Allan Lieberman
*Attorney, Agent, or Firm*—Francis W. Young; Jack H. Hall; Alan Stempel

[57] ABSTRACT

A solution containing cellulose dissolved in a mixture of a tertiary amine N-oxide solvent for cellulose and a compound which increases the rate of dissolution of cellulose in the solvent such as a tertiary amine or other compound which increases the pH of the solvent, a process for making such a solution and a process for making shaped articles therefrom are provided. The solvent dissolves cellulose at a faster rate and at a lower temperature than a solvent consisting of the same tertiary amine N-oxide.

29 Claims, No Drawings

SHAPEABLE TERTIARY AMINE N-OXIDE SOLUTION OF CELLULOSE, SHAPED CELLULOSE PRODUCT MADE THEREFROM AND PROCESS FOR PREPARING THE SHAPEABLE SOLUTION AND CELLULOSE PRODUCTS

This invention relates generally to a shapeable solution containing cellulose and, more particularly, to an improved process for preparing solutions of cellulose in a tertiary amine N-oxide and for making shaped cellulosic articles such as fibers and filaments therefrom.

A process for dissolving cellulose in a tertiary amine N-oxide is disclosed by Graenacher et al in U.S. Pat. No. 2,179,181. In accordance with the disclosure, oxides of trimethylamine, triethylamine, tripropylamine, monomethyldiethylamine, dimethyl-monoethylamine, monomethyldipropylamine, N-dimethyl-, N-diethyl- or N-dipropylcyclohexylamine, N-dimethylmethylcyclohexylamine and pyridine may be used. Cellulose dissolves relatively slowly in a tertiary amine N-oxide. Also the solutions disclosed by Graenacher have the disadvantage of having relatively low solids contents of from 7% to about 10% by weight of cellulose dissolved in 93 to 90% by weight of the tertiary amine N-oxide. Such low solids solutions are not entirely satisfactory for extruding, spinning or other shaping processes because the cellulose in the shaped solution must be precipitated by direct wet processing and a large amount of solvent must be removed from the shaped product. Insofar as the disclosure is concerned, the Graenacher solution is anhydrous.

Another process for dissolving cellulose or other compounds having strong intermolecular hydrogen bonding in a tertiary amine N-oxide is disclosed by Johnson in U.S. Pat. No. 3,447,939. A cyclic mono (N-methylamine-N-oxide) compound such as N-methyl-morpholine N-oxide is used as the solvent. The solution can be used in chemical reactions involving the dissolved compound or to precipitate the cellulose to form a film or filament. The disclosed process has many of the same disadvantages of the process disclosed in U.S. Pat. No. 2,179,181, because the solvent consists of tertiary amine N-oxide and the solutions are also of low solids content.

In accordance with the process disclosed by Johnson in U.S. Pat. No. 3,508,941, two or more different polymers are dissolved in a solvent consisting of a cyclic mono-(N-methylamine-N-oxide) compound and the polymers are precipitated together to produce a bicomponent polymer mixture A non-solvent for cellulose such as dimethylsulfoxide, N-methyl-pyrrolidone or sulfolane may be added to the solution as a diluent to reduce its viscosity. The disclosed solutions are also of low solids and have the same disadvantages as those of U.S. Pat. Nos. 2,179,181 and 3,447,939.

It is an object of this invention to provide an improved process for making a shapeable solution of cellulose in a tertiary amine N-oxide solvent. Another object of the invention is to provide solutions of cellulose in a tertiary amine N-oxide solvent for cellulose having a higher concentration of cellulose than those solutions which have been available heretofore. Other objects of the invention are to improve the rate of dissolution of cellulose in a tertiary amine N-oxide solvent and to provide solutions of cellulose in a tertiary amine N-oxide having relatively high solids contents which are adapted for shaping into a cellulosic article such as by molding, extrusion or spinning. Still another object of the invention is to provide a method of facilitating the dissolution of cellulose in a solvent containing a tertiary amine N-oxide to prepare solutions adapted to be spun or extruded to form shaped cellulose articles. A still further object of the invention is to provide a solution containing cellulose dissolved in a tertiary amine N-oxide solvent which has a lighter color then a solution of the cellulose in the same tertiary amine N-oxide alone. A more specific object of the invention is to provide a tertiary amine N-oxide solvent for cellulose which permits preparation of a solution containing cellulose in larger percentages than those solutions disclosed in the above discussed prior art and at a temperature below the melting point of the tertiary amine N-oxide and at a faster dissolution rate than with a solvent consisting of a tertiary amine N-oxide.

The foregoing objects and others are accomplished in accordance with this invention, generally speaking, by providing a process wherein cellulose is dissolved in a solvent containing a tertiary amine N-oxide and an alkaline compound which is compatible with the tertiary amine N-oxide and which increases the dissolution rate of the cellulose in the solvent. Examples of such compounds are alkali metal hydroxides, aqueous ammonia or compounds having the formula $$NR_3 \text{ or } NR_4OH$$

wherein R can be hydrogen, alkyl, aralkyl, aryl, hydroxyl, amine or substituted amine. Such compounds include amines, alkali metal hydroxides, aqueous ammonia and other compounds which will increase the pH of the tertiary amine N-oxide solvent when mixed therewith. Suitable amines are primary, secondary and tertiary amines such as aniline, toluene amine, toluylene diamine, diphenylamine, dicyclohexylamine, N-methylmorpholine, N,N-dimethylethanolamine, triethylamine, dimethylpiperazine, N-phenyl-N,N-diethanolamine, and the like. The alkali metal hydroxide may be sodium hydroxide, potassium hydroxide, lithium hydroxide or the like. An aprotic liquid such as dimethylformamide, sulfolane or other aprotic liquids disclosed in the co-pending application Ser. No. 854,957 filed by Franks and Varga on Nov. 25, 1977, now U.S. Pat. No. 4,145,532, may be included also in the solvent. The mixture of a tertiary amine N-oxide and a compound such as a free amine has been found to dissolve cellulose faster and to produce a solution having a lighter color than the tertiary amine N-oxide alone. It is believed that this increased dissolution rate of the solvent mixture of the invention is primarily due to an increase in pH of the tertiary amine N-oxide solvent but the applicant does not wish to be bound to such a theory or explanation. It is necessary to wet spin the solution of the invention.

As set forth in the co-pending application Ser. No. 854,957 filed on Nov. 25, 1977 and copending application Ser. No. 938,907, filed Sept. 1, 1978, now U.S. Pat. No. 4,196,282, the disclosures of which are incorporated herein by reference thereto, water may be included in a tertiary amine N-oxide solvent for cellulose to adapt the solution for dissolving cellulose at a temperature below the melting point of the tertiary amine N-oxide. Many tertiary amine N-oxides have a melting point at about the boiling point of water or higher so those processes disclosed in the Graenacher et al and Johnson patents discussed above using an anhydrous tertiary amine N-oxide at such high temperatures are not entirely satisfactory. In accordance with the present invention substantially anhydrous tertiary amine N-oxide solvents containing mixtures of the tertiary amine N-oxide and a compound which increases the dissolution rate of the cellulose such as a tertiary amine may be used to dissolve cellulose but mixtures of tertiary amine N-oxide, water and one of the compounds disclosed above are preferred as solvents for cellulose because such solvents dissolve cellulose more rapidly and also at a temperature below the temperature where tertiary amine N-oxide alone or tertiary amine N-oxide and water are used.

The tertiary amine may be the same as the one which was oxidized to make the tertiary amine N-oxide or it may be a different compatible tertiary amine. For example, N-methylmorpholine N-oxide may be mixed with N-methylmorpholine or with some other tertiary amine such as N,N-dimethylethanolamine. Likewise, N,N-dimethylethanolamide N-oxide may be mixed with N,N-dimethylethanolamine or with N-methylmorpholine. In fact it has been found that the tertiary amine mixed with the tertiary amine N-oxide solvent to improve the rate at which cellulose is dissolved may even be one which when oxidized is not a solvent for cellulose such as, for example, N,N-dimethylpiperazine and N-phenyl-N,N-diethanolamine. Mixtures of two or more amines or other compounds which will accelerate dissolution of cellulose may be mixed with the tertiary amine N-oxide, if desired.

In practicing the invention solvents for cellulose containing a tertiary amine N-oxide and up to about 29% by weight water based on the weight of the solution may be used.

The amount of amine or other compound disclosed herein required to accelerate dissolution of cellulose in a tertiary amine N-oxide will vary somewhat from one tertiary amine N-oxide solvent to another but with most tertiary amine N-oxides as little as one percent or less will accelerate dissolution of the cellulose to a significant extent. The upper limit on the amount of compound added to accelerate dissolution is determined by the reduction in solubility of cellulose in the solvent. It has been found that although the tertiary amine or similar compound is desirable to reduce the dissolution time, it also tends to reduce the solubility of cellulose in the solvent so excessive amounts of tertiary amine should be avoided. Preferably with most tertiary amine N-oxides the percentage of free tertiary amine or other compound added to the solvent should be up to about 20% by weight based on the weight of solution to accelerate dissolution of the cellulose. Such amount significantly accelerate dissolution of the cellulose without significant reduction in the amount of cellulose that can be dissolved in the solvent. More than 10% tertiary amine can be used to decrease the cellulose dissolution time but the color of the solution becomes darker as the amount of tertiary amine is increased about 10% by weight based on the total weight of solution.

Any suitable tertiary amine N-oxide and tertiary amine combination may be used. The preferred tertiary amine N-oxides are triethylamine N-oxide and cyclic or pseudo-cyclic amine N-oxides as disclosed in Franks and Varga in application Ser. No. 854,957 filed on Nov. 25, 1977. Typical examples of the cyclic and pseudo-cyclic tertiary amine N-oxides which can be used in practicing the invention are:

N-methylhomopiperidine N-oxide
N-methylpiperidine N-oxide
N-methylmorpholine N-oxide
N,N-dimethylcyclohexylamine N-oxide
N,N-dimethylbenzylamine N-oxide
N,N-dimethylethanolamine N-oxide
2(2-hydroxypropoxy)N-ethyl-N,N-dimethylamine N-oxide.

In addition triethylamine N-oxide can be used.

Although the amount of water in the solvent can vary in any amount of up to 29% by weight based on the total weight of the solution, the amount of water should not be sufficient to significantly reduce the solubility of cellulose in the solvent. Hence, the amount of water mixed with the tertiary amine-N-oxide in preparing the solvent mixture of the invention decreases substantially linearly with increase in the amount of cellulose to be dissolved.

In the following examples all parts and percentages are by weight unless otherwise indicated.

EXAMPLE I

A. About 5.3 parts cellulose containing about 6% water were dissolved in a solvent containing about 21.4 parts N,N-dimethylcyclohexylamine N-oxide containing about 11.4% water and having a melting point of 128°-130° C., about 1.1 parts N,N-dimethylcyclohexylamine and about 7.5 parts dimethylformamide at a temperature of 80°-90° C. The solvent dissolved the cellulose to form a solution free from undissolved cellulose in about 30 minutes. The cuene viscosity at 0.5% cellulose was about 3.7.

B. For comparison, a solution of the same cellulose was prepared under the same conditions with a solvent of the same composition except no free tertiary amine or other compound contemplated as an additive herein was included. The solution had a cuene viscosity at 0.5% cellulose concentration of about 3.7 and 60 minutes were required for complete dissolution of the cellulose.

EXAMPLE II

Example I was repeated except about 5.3 parts Visco Cell ELV wood pulp containing about 6% water were dissolved in a solvent consisting of about 20.3 parts N,N-dimethylcyclohexylamine N-oxide, about 2.3 parts N,N-dimethylcyclohexylamine, and about 7.5 parts dimethylformamide.

The cellulose fibers were swollen as rapidly in the solvent as they were in the solvent of Example I. The cellulose was completely dissolved after 20 minutes at 80°-90° C. The viscosity of a 0.5% solution in cuene was about 4.

EXAMPLE III

The procedure of Example I was repeated with a solvent prepared by mixing about 19.1 parts N,N-dimethylcyclohexylamine N-oxide containing about 11.4% water and having a melting point of 128°-130° C., about 3.4 parts N,N-dimethylcyclohexylamine and about 7.5 parts dimethylformamide. About 5.3 parts Visco Cell ELV wood pulp containing about 6% water were dissolved in the solvent at 80°-90° C. The cellulose fiber swelled as quickly in the solvent as those of Example I. The cellulose had completely dissolved after 30 minutes. The viscosity of a 0.5% solution in cuene was about 3.6.

EXAMPLE IV

Example I was repeated except about 5.3 parts of Visco Cell ELV wood cellulose containing about 6% water were dissolved in a mixture of about 18 parts of N,N-dimethylcyclohexylamine N-oxide containing about 11.4% water, about 4.5 parts (20%) of N,N-dimethylcyclohexylamine and about 7.5 parts dimethylformamide at 80°-90° C. The cellulose fiber did not swell appreciably but the cellulose was completely dissolved after about 60 minutes. The solution was cloudy, slightly gel-like and very viscous. The viscosity of a 0.5% solution in cuene was about 3.6.

EXAMPLE V

Example IV was repeated except the free amine in the solution was increased to about 25%. About 15% of the cellulose remained undissolved after 60 minutes.

EXAMPLE VI

About 3.3 parts Visco Cell wood pulp containing about 6% water was dissolved in a mixture of 28.5 parts N,N-dimethylethanolamine N-oxide containing about 10.9% water and 1.5 parts N,N-dimethylethanolamine at 105° C. The cellulose was completely dissolved after 30 minutes.

EXAMPLE VII

Example VI was repeated except 3.3 parts wood pulp containing about 6% by weight water was dissolved in a solvent prepared by mixing 27 parts N,N-dimethylethanolamine N-oxide containing about 11% water and about 3 parts N,N-dimethylethanolamine (9%). Swelling of the cellulose was not observed. The cellulose was completely dissolved after 25 minutes at 105° C. The solution was highly viscous ($\eta=4.31$) and spinnable.

EXAMPLES VIII A-H

A series of solutions was prepared by dissolving cellulose in the amounts indicated in Table I. The tertiary amine N-oxide used in preparing all of the solutions was dimethylcyclohexylamine N-oxide and the tertiary amine was N,N-dimethylcyclohexylamine. In addition to the tertiary amine N-oxide and tertiary amine, dimethylformamide (DMF) was included in some solutions as indicated in Table I. The N,N-dimethylcyclohexylamine N-oxide contained about 11.4% water and melted at about 128°-130° C.

TABLE I

| Example | Amine (wt.%) | % DMF | Dissolving Temp. (°C.) | % Cell | Time |
|---|---|---|---|---|---|
| A | 10 | 0 | 110-115 | 15 | Dissolved in 10-15 min. |
| B | 15 | 0 | 110-115 | 15 | Dissolved in 15-20 min. |
| C | 0 | 25 | 80-90 | 15 | Dissolved in 60 min. |
| D | 5 | 25 | 80-90 | 15 | Dissolved in 30 min. |
| E | 10 | 25 | 80-90 | 15 | Dissolved in 20 min. |
| F | 15 | 25 | 80-90 | 15 | Dissolved in 30 min. |
| G | 20 | 25 | 80-90 | 15 | Dissolved in 60 min. |
| H | 25 | 25 | 80-90 | 15 | Did not dissolve |

The cellulose was wood pulp. The time reported in Table I is the time period required for complete dissolution of the cellulose indicated by the absence of fibers determined by microscopic examination.

EXAMPLES IX A-D

Example VIII was repeated except N,N-dimethylethanolamine N-oxide and N,N-dimethylethanolamine were substituted for N,N-dimethylcyclohexylamine N-oxide and N,N-dimethylcyclohexylamine. The data obtained are shown in Table II. The N,N-dimethylethanolamine N-oxide contained about 11% water and the melting point was about 98°-100° C.

TABLE II

| Example No. | Amount Amine (wt. %) | % Cell | Dissolving Temp. (°C.) | Time |
|---|---|---|---|---|
| A | 0 | 10 | 105 | Dissolved in 40 min. |
| B | 5 | 10 | 105 | Dissolved in 30 min. |
| C | 10 | 10 | 105 | Dissolved in 25 min. |
| D | 15 | 10 | 105 | Dissolved in 35 min. |

The solvent may contain an aprotic, organic, liquid non-solvent for cellulose as a diluent to reduce the viscosity of the solution, if desired. Any suitable aprotic, organic liquid which is not chemically reactive with the other components of the solvent and will not cause degradation of the cellulose including those disclosed in our aforesaid co-pending application may be used. Examples are dimethylsulfoxide, dimethylformamide, dimethylacetamide, N-methylpyrrolidone, hexamethylphosphorous triamide, acetonitrile, sulfolane and the like.

EXAMPLE X

About 87 parts by weight N-methylmorpholine N-oxide containing about 16% water and about 20 parts water were mixed together. About 23 parts V-68 wood pulp were soaked in the resulting mixture at 75° C. until all of the liquid was absorbed by the cellulose and the product was transferred to a 2 CV Atlantic Mixer and homogenized at 94°-95° C. for 15 minutes @200 RPM. A vacuum of 22 inches mercury was applied to remove excess water. After 60 minutes stirring the cellulose had not dissolved completely. A sample observed under a hot stage microscope showed crystals of the tertiary amine N-oxide. When the temperature was increased slowly to 94°-115° C., the crystals disappeared.

EXAMPLE XI

Example X was repeated except N-methylmorpholine (NMM) was added to the tertiary amine N-oxide in the amounts indicated in Table III. The dissolution temperature and times are shown in the Table.

TABLE III

| NMMO* + NMM** | Composition before Dissolving | | | | Dissolv. | Time to | | |
|---|---|---|---|---|---|---|---|---|
| | Cellulose % | N-O % | Amine % | $H_2O$ % | Temp. °C. | Dissolve Min. | Vacuum inch Hg | Comments |
| | 16.9 | 56.0 | 0 | 27.1 | 85 | >80 | 22 | No solution at 85°, opaque |
| | 16.9 | 56.0 | 0.03 | 27.1 | 85 | 70 | 22 | Clear, light solution |
| | 15.6 | 51.6 | 7.7 | 25.0 | 85 | 50 | 22 | Clear, very light solution |
| | 15.2 | 50.3 | 10.1 | 24.4 | 85 | 50 | 22 | Clear, slightly darker than preceeding solution |
| | 14.3 | 47.5 | 15.2 | 23.0 | 85 | 50 | 22 | Clear, darker solution |
| | 16.6 | 56.2 | 0 | 27.2 | 94–115 | >60 | 22 | No solution at 94° C. |
| | 16.5 | 56.2 | 0.06 | 27.2 | 94 | 32 | 22 | Clear, light solution |
| | 16.4 | 55.9 | 0.6 | 27.1 | 94 | 35 | 22 | Clear, light solution |
| | 16.7 | 55.4 | 1.1 | 26.8 | 94 | 35 | 23 | Clear, dark yellow solution |
| | 16.9 | 56.0 | 0 | 27.1 | 120 | 15 | 22 | Dark, brownish solution |
| | 16.9 | 56.0 | 0.03 | 27.1 | 120 | 15 | 22 | Clear, reddish yellow solution |
| | 16.7 | 55.4 | 1.1 | 26.8 | 120 | 15 | 22 | Clear, reddish yellow solution |

*NMMO — N-methylmorpholine N-oxide
**NMM — N-methylmorpholine

EXAMPLE XII

Example X was repeated except N,N-dimethylethanolamine (DMEA), N,N-dimethylpiperazine and N-phenyl-N,N-diethanolamine were mixed with N-methylmorpholine N-oxide in the amounts shown in Table IV.

TABLE IV

| N—O Amine | Composition before Dissolving | | | | Dissolv. | Time to | | |
|---|---|---|---|---|---|---|---|---|
| | Cellulose % | N—O % | Amine % | $H_2O$ % | Temp. °C. | Dissolve Min. | Vacuum inch Hg | Comments |
| NMMO* + DMEA** | 6.8 | 49.9 | 20.5 | 22.7 | 89–90 | 50 | 23 | Clear, light solution |
| NMMO* + DMEA** | 9.9 | 76.0 | 13.2 | 0.9 | 115–130 | 25 | 23 | Clear, red solution during picture taking |
| NMMO + N,N-Dimethylpiperazine | 7.8 | 57.2 | 3.9 | 31.0 | 89–90 | 105 | 23 | Clear solution |
| NMMO + N-phenyl-N,N-diethanolamine | 8.4 | 61.5 | 4.3 | 25.8 | 89–90 | 70 | 23 | Clear solution |

*NMMO - N-methylmorpholine N-oxide
**DMEA - N,N-dimethylethanolamine

EXAMPLE XIII

The procedure of Example X was repeated. A mixture of 65.6% N-methylmorpholine N-oxide, 25.3% water and 9.1% cellulose was mixed with concentrated sulfuric acid to adjust the pH of the mixture to 2. The cellulose had not dissolved after 95 minutes at 89° to 130° C. under 22.4 inches of mercury. No tertiary amine was included in the solvent.

EXAMPLE XIV

Example X was repeated except the pH of the mixture was adjusted to 14 with sodium hydroxide. The cellulose dissolved to form a clear solution in 80 minutes at 89°-90° C. under a vacuum of 22.8 inches mercury.

EXAMPLE XV

Example X was repeated except the pH of the mixture was adjusted to 12.3 with aqueous ammonia. The cellulose dissolved in the mixture in 40 minutes at 89°-90° C. under a vacuum of about 23 inches mercury to form a substantially colorless solution.

EXAMPLE XVI

The procedure of Example X was repeated, except a mixture containing 62.9% N-methylmorpholine N-oxide, 24.2% water, 8.6% wood pulp and 4.3% benzylamine was used. The cellulose dissolved in the mixture in 35 minutes at 89°-90° C. under a vacuum of about 23 inches mercury forming a substantially colorless solution.

EXAMPLE XVII

The procedure of Example XVI was repeated except 4.3% diphenylamine was substituted for the benzylamine. The cellulose dissolved in the mixture in 40 minutes at 89°-90° C. under a vacuum of about 23 inches mercury to form a substantially colorless solution.

In addition to the compounds identified above as suitable for accelerating the dissolution of cellulose in a tertiary amine N-oxide solvent, alkali metal salts of inorganic acids which in aqueous solution have a pH above 7 and alkali metal salts of organic acids such as sodium pyrophosphate, trisodium phosphate, disodium monohydrogen phosphate, sodium carbonate, potassium carbonate, and lithium acetate may be used. Also oxides and hydroxides of alkaline earth metals and alkaline salts of alkaline earth metals may be used.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for preparing a solution containing cellulose dissolved in a solvent containing a tertiary amine N-oxide, the improvement which comprises dissolving the cellulose in a solvent containing both a tertiary amine N-oxide and an alkaline compound which increases the rate at which the cellulose dissolves in the solvent.

2. The process of claim 1 wherein the said compound mixed with the tertiary amine N-oxide increases the pH of the solvent.

3. The process of claim 2 wherein the compound which increases the pH is a tertiary amine.

4. The process of claim 3 wherein the tertiary amine has the same composition as the tertiary amine which was oxidized to prepare the tertiary amine N-oxide.

5. A process for accelerating the rate at which cellulose dissolves in a solvent containing a tertiary amine N-oxide which comprises increasing the pH of the solvent above the pH of the tertiary amine N-oxide and soaking cellulose therein until it dissolves.

6. In a process for making shaped cellulose articles which comprises dissolving cellulose in a solvent therefor containing a tertiary amine N-oxide and water, shaping the resulting solution and precipitating the cellulose, the improvement which comprises dissolving the cellulose in a solvent containing a mixture of tertiary amine N-oxide and an amine.

7. The process of claim 6 wherein the mixture containing a tertiary amine N-oxide, water and cellulose also contains about 0.03% to about 21% by weight tertiary amine based on the weight of said mixture.

8. The process of claim 6 wherein the mixture contains from about 1.4% to about 29% water and about 0.03% to about 21% tertiary amine.

9. The process of claim 6 wherein the solvent contains an aprotic solvent.

10. The process of claim 8 wherein the tertiary amine has the same composition as the tertiary amine that was oxidized to produce the tertiary amine N-oxide.

11. The process of claim 3 wherein the tertiary amine is one which when oxidized is not a solvent for cellulose.

12. The process of claim 3 wherein the tertiary amine is one which when oxidized is a solvent for cellulose.

13. The process of claim 2 wherein the compound which increases the pH of the solvent is an alkali metal hydroxide.

14. The process of claim 2 wherein the compound which increases the pH of the solvent is aqueous ammonia.

15. The process of claim 2 wherein the compound which increases the pH is a primary amine.

16. The process of claim 2 wherein the compound which increases the pH is a secondary amine.

17. The process of claim 3 wherein the tertiary amine N-oxide is N-methylmorpholine N-oxide, N,N-dimethylcyclohexylamine N-oxide, N,N,N-triethylamine N-oxide, N,N-dimethylethanolamine N-oxide, N,N-dimethylbenzylamine N-oxide, N-methylhomopiperidine N-oxide, N-methylpiperidine N-oxide or 2(2-hydroxypropoxy)-N-ethyl-N,N-dimethylamine N-oxide and the tertiary amine is the same as the one oxidized to form said tertiary amine N-oxide.

18. The process of claim 3 wherein the tertiary amine N-oxide is N-methylmorpholine N-oxide, N,N-dimethylcyclohexylamine N-oxide, N,N,N-triethylamine N-oxide, N,N-dimethylethanolamine N-oxide, N,N-dimethylbenzylamine N-oxide, N-methylhomopiperidine N-oxide, N-methylpiperidine N-oxide or 2(2-hydroxypropoxy)-N-ethyl-N,N-dimethylamine N-oxide and the tertiary amine is different from the one oxidized to produce the tertiary amine N-oxide.

19. The process of claim 2 wherein the tertiary amine N-oxide is N-methylmorpholine N-oxide, N,N-dimethylcyclohexylamine N-oxide, N,N,N-triethylamine N-oxide, N,N-dimethylethanolamine N-oxide, N,N-dimethylbenzylamine N-oxide, N-methylhomopiperidine N-oxide, N-methylpiperidine N-oxide or 2(2-hydroxypropoxy)-N-ethyl-N,N-dimethylamine N-oxide and the compound added to increase the pH is an alkali metal hydroxide, aqueous ammonia, a secondary amine or primary amine.

20. A solution containing cellulose dissolved in a solvent containing a tertiary amine N-oxide and an alkaline compound which accelerates dissolution of cellulose in the solvent, said solution being a liquid at a temperature below the melting point of the tertiary amine N-oxide.

21. The solution of claim 20 containing water.

22. The solution of claim 20 having a pH higher than the pH of the tertiary amine N-oxide in water.

23. The solution of claim 21 having a pH higher than the pH of the tertiary amine N-oxide.

24. The solution of claim 20 or claim 21 in which the said alkaline compound which accelerates dissolution of cellulose is an amine.

25. The solution of claim 20 or claim 21 in which the said alkaline compound which accelerates dissolution of cellulose is aqueous ammonia.

26. The solution of claim 20 or claim 21 in which the said compound which accelerates dissolution of cellulose is alkali metal hydroxide.

27. The process of claim 1 wherein the said compound which increases the rate of dissolution of cellulose in the solvent has a pH of more than 7.

28. The process of claim 1 wherein the compound added to increase the rate of dissolution of cellulose in the solution is sodium pyrophosphate.

29. In a process for preparing a solution containing cellulose dissolved in a solvent containing a tertiary amine N-oxide, the improvement which comprises mixing with the solvent and cellulose to increase the rate at which the cellulose dissolves, ammonia, an alkali metal hydroxide or a compound having the formula $NR_3$ or $NR_4OH$ wherein R is hydrogen, alkyl, aralkyl, aryl hydroxyl, primary amine or substituted amine.

* * * * *